US007865521B2

(12) United States Patent
Bird et al.

(10) Patent No.: US 7,865,521 B2
(45) Date of Patent: *Jan. 4, 2011

(54) ACCESS CONTROL FOR ELEMENTS IN A DATABASE OBJECT

(75) Inventors: Paul Miller Bird, Markham (CA); Walid Rjaibi, Markham (CA)

(73) Assignee: International Business Machines Corporation, Armonk, NY (US)

( * ) Notice: Subject to any disclaimer, the term of this patent is extended or adjusted under 35 U.S.C. 154(b) by 263 days.

This patent is subject to a terminal disclaimer.

(21) Appl. No.: 11/299,857

(22) Filed: Dec. 12, 2005

(65) Prior Publication Data

US 2007/0136291 A1 Jun. 14, 2007

(51) Int. Cl.
*G06F 7/00* (2006.01)
*G06F 17/30* (2006.01)

(52) U.S. Cl. .................... 707/781; 707/783; 707/999.1; 707/999.9

(58) Field of Classification Search ................ 707/1–10, 707/781, 783, 999.1, 999.9
See application file for complete search history.

(56) References Cited

U.S. PATENT DOCUMENTS

| 5,815,574 | A | 9/1998 | Fortinsky |
| 6,026,388 | A | 2/2000 | Liddy et al. |
| 6,085,191 | A * | 7/2000 | Fisher et al. .................... 707/9 |
| 6,308,273 | B1 | 10/2001 | Goertzel et al. |
| 6,321,235 | B1 | 11/2001 | Bird ........................... 707/203 |
| 6,321,334 | B1 | 11/2001 | Jerger et al. |
| 6,424,974 | B1 | 7/2002 | Cotner et al. ............... 707/103 |
| 6,487,552 | B1 * | 11/2002 | Lei et al. ...................... 707/4 |
| 6,643,633 | B2 | 11/2003 | Chau et al. ..................... 707/1 |
| 6,721,727 | B2 | 4/2004 | Chau et al. ..................... 707/3 |
| 7,133,875 | B1 * | 11/2006 | Chatterjee et al. ..... 707/999.102 |
| 2003/0046550 | A1 * | 3/2003 | Carroll et al. ............... 713/185 |
| 2004/0139043 | A1 * | 7/2004 | Lei et al. ...................... 707/1 |
| 2005/0246338 | A1 | 11/2005 | Bird |
| 2007/0033196 | A1 * | 2/2007 | Moore ......................... 707/10 |
| 2007/0038596 | A1 * | 2/2007 | Pizzo et al. .................... 707/2 |
| 2008/0275880 | A1 | 11/2008 | Bird et al. |

OTHER PUBLICATIONS

Panagiotis Katsaros, "On the Design of Access Control to Prevent Sensitive Information Leakage in Distributed Object Systems: A Colored Petri Net Based Model", SpringerLink Contemporary, Oct. 11, 2005, vol. 3761. Download: http://www.springerlink.com/content/5p71w09j9rlepaye/fulltext.pdf.*

(Continued)

*Primary Examiner*—John E Breene
*Assistant Examiner*—Hares Jami
(74) *Attorney, Agent, or Firm*—Terry Carroll; SVL IP Law

(57) ABSTRACT

A method, for controlling access to elements in a database object are provided. The method provide for receiving a request from a user to access the database object, determining whether an access restriction is imposed on the database object, and controlling access to the elements in the database object by the user based on the access restriction. The access restriction specifies one or more users to which the access restriction is applicable, defines a dynamic condition the one or more users must satisfy in order to access the database object, and identifies one or more of the elements in the database object accessible to the one or more users when the dynamic condition is satisfied.

30 Claims, 7 Drawing Sheets

OTHER PUBLICATIONS

Hadjiefthymiades, SP et al., "A Generic Framework for the Deployment of Structured Databases on the World Wide Web," Computer Networks and ISDN Systems, May 1996, vol. 28, No. 7-11, 9 pgs.

Zhenchuan, Xu et al., "Dynamic Tuning of XML Storage Schema in VXMLR," IEEE 2003, Proceedings of the Seventh International Database Engineering and Applications Symposium, pp. 1-11.

International Search Report (ISR) dated Jan. 3, 2007, for corresponding foreign Application.

Rakesh Agrawal, et al., "Extending Relational Database Systems To Automatically Enforce Privacy Policies", IBM Almaden Research Center, 650 Harry Road, San Jose, CA, Proceedings of the 21st International Conference on Data Engineering, IEEE, 2005.

Office Action dated Oct. 16, 2006; cited in U.S. Appl. No. 10/837,387.

Final Office Action dated May 4, 2007; cited in U.S. Appl. No. 10/837,387.

Office Action dated Oct. 18, 2007; cited in U.S. Appl. No. 10/837,387.

Office Action dated Apr. 23, 2008; cited in U.S. Appl. No. 10/837,387.

Office Action dated Apr. 10, 2009; cited in U.S. Appl. No. 10/837,387.

Tzelepi, S. et al., "Security of Medical Multimedia," Medical Informatics and the Internet in Medicine, vol. 27, No. 3, Sep. 2002, pp. 169-184.

Damiani, E. et al., "Regulating Access to Semistructured Information on the Web," Information Security for Global Information Infrastructures, Sixteenth Annual Working Conf. on Information Security, Aug. 22-24, 2000, Beijing, China, pp. 351-360.

Duesterwald, E. "A Practical Data Flow Framework for Array Reference Analysis and its use in Optimizations," ACM Sigplan Notices vol. 28, No. 6, Jun. 1993, Proc of the ACM SIGPLAN '93 Conf. on Programming Language Design and Implementation Albuquerque, NM, Jun. 23-25, pp. 68-67.

Low, M. et al., "Fine Grained Object Protection in Unix," Operating Systems Review vol. 27, No. 1, Jan. 1993, pp. 33-50.

Salemi, C. et al., "A Privilege Mechanism for UNIX System V Release 4 Operating Systems," Conf. Proceedings, USENIX, Summer 1992 Technical Conf., San Antonio, Texas, Jun. 8-12, 1992, pp. 235-241.

Leiss, E. et al., "Protecting Statistical Databases by Combining Memoryless Table Restrictions With Randomizations," AFIPS Conf., Proc., vol. 56, 1987 National Computer Conference, Jun. 15-18, 1987, Chicago, Illinois, pp. 591-600.

Damiani, E. et al., "A Fine-Grained Access Control System for XML Documents," ACM Transactions on Information and System Security, vol. 5, No. 2, May 2002, pp. 169-202.

Grimm, R. et al., "Separating Access Control Policy, Enforcement, and Functionality in Extensible Systems," ACM Transactions on Computer Systems, vol. 19, No. 1, Feb. 2001, pp. 36-70.

Coulouris, G. et al., "Security Requirements for Cooperative Work: A Model and Its System Implications," Position Paper for 6th SIGOPS European Workshop, Dagstuhl, Sep. 1994, pp. 184-186.

Wang, Weigang, "Team-and-Role Based Organizational Context and Access Control for Cooperative Hypermedia Environments," Hypertext 99, Darmstadt Germany, Copyright ACM 1999, pp. 37-46.

Böhlen, Michael H. et al., "Temporal Statements Modifiers," ACM Transaction on Database Systems, vol. 25, No. 4, Dec. 2000, pp. 407-456.

Lakshmanan, Laks, V.S. et al., "SchemaSQL-An Extension to SQL for Multidatabase Interoperability," ACM Transactions on Database Systems, vol. 26, No. 4, Dec. 2001, pp. 476-519.

Ng, Wilfred, "An Extension of the Relational Data Model to Incorporate Ordered Domains," ACM Transactions on Database Systems, vol. 26, No. 3, Sep. 2001, pp. 344-383.

Hadjiefthymiades, SP et al., "A Generic Framework for the Deployment of Structured Databases on the World Wide Web," Computer Networks and ISDN Systems, May 1996, vol. 28, No. 7-11, pp. 1139-1148. (Abstract).

Zhenchuan, Xu et al., "Dynamic Tuning of XML Storage Schema in VXMLR," 2003, Proceedings International Database Engineering and Applications Symposium, pp. 76-86. (Abstract).

* cited by examiner

|  | 602 | 604 | 606 | 608 |
|---|---|---|---|---|
|  | NAME | ADDRESS | PHONE | CREDIT CARD |
| 610-1 | J. Adams | 290 E. 59th Street, New York, NY | (212) 555-1555 | 2221-5553-4466-8837 |
| 610-2 | T. Browne | 15 W. 19th Street, Chicago, IL | (312) 555-4587 | 6351-4215-7893-1105 |
| 610-3 | M. Davis | 8890 N.W. 8th Street, Miami, FL | (305) 555-8259 | 4821-1355-7913-4103 |
| 610-4 | C. Edwards | 63 University Street, Seattle, WA | (206) 555-5692 | 8923-7561-5225-8978 |
| 610-5 | P. Hall | 700 Pacific Avenue, Dallas, TX | (214) 555-7396 | 3614-7465-0121-3254 |
|  | ⋮ | ⋮ | ⋮ | ⋮ |
| 610-n | W. Zappa | 39 N.W. H Street, Washington, DC | (202) 555-6923 | 5214-9874-3156-5647 |

612a

| NAME | ADDRESS | CREDIT CARD |
|---|---|---|
| J. Adams | 290 E. 59th Street, New York, NY | 2221-5553-4466-8837 |
| T. Browne | 15 W. 19th Street, Chicago, IL | 6351-4215-7893-1105 |
| M. Davis | 8890 N.W. 8th Street, Miami, FL | 4821-1355-7913-4103 |
| C. Edwards | 63 University Street, Seattle, WA | 8923-7561-5225-8978 |
| P. Hall | 700 Pacific Avenue, Dallas, TX | 3614-7465-0121-3254 |
| ⋮ | ⋮ | ⋮ |
| W. Zappa | 39 N.W. H Street, Washington, DC | 5214-9874-3156-5647 |

612b

| NAME | ADDRESS |
|---|---|
| J. Adams | 290 E. 59th Street, New York, NY |
| T. Browne | 15 W. 19th Street, Chicago, IL |
| M. Davis | 8890 N.W. 8th Street, Miami, FL |
| C. Edwards | 63 University Street, Seattle, WA |
| P. Hall | 700 Pacific Avenue, Dallas, TX |
| ⋮ | ⋮ |
| W. Zappa | 39 N.W. H Street, Washington, DC |

*FIG. 6*

ACCESS CONTROL FOR ELEMENTS IN A DATABASE OBJECT

FIELD OF THE INVENTION

The present invention relates generally to database management systems. More particularly, the present invention is directed to controlling access to elements in a database object.

BACKGROUND OF THE INVENTION

In a Database Management System (DBMS), data is stored in tables made up of records (e.g., rows) having one or more fields (e.g., columns). A view is a logical construct imposed over a table and is defined by metadata in the DBMS known as a view definition. The view definition contains mappings to one or more rows and columns in one or more tables stored in a database. Tables and views are considered to be database objects.

Fine-Grained Access Control (FGAC) is a mechanism by which the DBMS controls access to database object records and/or fields based on the identity of the user attempting to access the database object. FGAC complements the traditional Discretionary Access Control (DAC) implemented by many DBMS by allowing the DBMS to enforce two levels of access control: DAC is enforced at the object level (e.g., does the user have the right to access that table?) and FGAC is enforced at the element level (e.g., does the user have the right to access that row or column?).

Traditional methods of implementing FGAC within DBMS have relied upon the use of views. A view can be used to alter or restrict the data seen by a user using the view to access the underlying table(s). Views, however, have a number of shortcomings. For example, when the number of different restrictions is numerous, view definitions may become quite complex in an effort to incorporate all of the restrictions in one view, which strains system limits and makes maintenance of the view difficult.

Additionally, if a large number of simple views are desired, e.g., each one implementing a unique view of a table based on the restrictions for a specific set of users, the routing of user requests becomes difficult with the solution often being resolved within the database application rather than the DBMS. Furthermore, a user may be able to bypass the FGAC implemented through the views by accessing the base tables directly.

Another known implementation of FGAC is the use of user attributes to modify queries by adding predicates into the queries. A predicate is a condition that must be satisfied for the DBMS to return a value. In this approach, the user attributes (e.g., user identifier) are compared against a security policy defined within a procedure provided by the user on a table or view to make decisions regarding access to data. This approach allows row restrictions, traditionally handled by views, to be dynamically added to queries without requiring application modification.

One drawback of the query modification approach is that it only allows the DBMS to control access at the row-level. Views still have to be used to control access at the column-level. Additionally, the approach requires user programming of a strictly defined "predicate producing" procedure in order to implement a security policy. Moreover, query modification interferes with dynamic query caching because the modified queries will no longer match the original text of the queries, which makes query matching problematic and impacts the performance benefits of caching.

Further, the solutions described above fail to address the requirements from emerging privacy applications. Generally, a privacy policy indicates who can access what information, for what purpose, and resulting in what obligations. For example, a user John Doe may be allowed to access the credit card column from a customer table if he is using the billing application to process a customer order, but he may not be allowed to access that column for the purpose of sending marketing information to the customer. Existing FGAC solutions cannot address this requirement because they either do not support controlling access at the column level or they provide control access at the column level, but only for columns that have been statically defined (i.e., view-based techniques). Hence, a user is always restricted to a set of columns, regardless of the purpose for which he or she is accessing those columns.

Privacy applications are only one example where such flexibility is needed. Recent user requirements in the area of database security indicate that there is a need for database vendors to provide the notion of a session context. A session context is uniquely identified by a set of session attributes that may include the ID of the user who established that session, the IP address of the computer from which the user initiated the session, as well as other attributes as dictated by a particular implementation or scenario. Within a particular context, a user can have one or more privileges on one or more database objects that are not necessarily available to them within a different context. Thus, it is only natural that the next logical user requirement would be to allow certain columns to be accessible within one context, but not within another context. Currently, the only way to accomplish this would be to define a set of views that restrict access to certain columns and grant access on those views to users depending on their session context. Maintaining several views, however, has the same drawbacks mentioned earlier.

Accordingly, there is a need for a flexible mechanism to control access to elements in a database object based on one or more dynamic conditions, such as a session context or an access purpose without requiring the creation and maintenance of static views or the modification of queries. The present invention addresses such a need.

SUMMARY OF THE INVENTION

A method, computer program product, and system for controlling access to elements in a database object are provided. In this document, a group of one or more users is denoted as a user group and a set of one or more of the elements in a database object is denoted as an element set in the database object. The method, computer program product, and system provide for receiving a request from a user to access the database object, determining whether an access restriction is imposed on the database object, the access restriction specifying a first user group to which the access restriction is applicable, defining a first dynamic condition the first user group must satisfy in order to access the database object, and identifying a first element set in the database object accessible to the first user group when the first dynamic condition is satisfied, and controlling access to the elements in the database object by the user based on the access restriction.

Controlling access to elements in a database object using access restrictions, rather than views or modified queries, eliminates the worries concerning the creation and maintenance of complex views, the users bypassing restrictions by accessing underlying tables directly, the difficulties associated with routing user requests when there is a large number of views, the ability to control access at both the row and column level, the need to program strictly defined "predicate producing" procedures, and the problems of dynamic query caching interferences. In addition, because the access restrictions are defined using one or more dynamic conditions, the flexibility needed to address current privacy and security concerns is achieved.

Particular implementations can include controlling access to the elements in the database object by confirming whether the user is in the first user group when the access restriction is imposed on the database object, verifying whether the user satisfies the first dynamic condition when the user is in the first user group, and allowing the user to access the first element set when the user satisfies the first dynamic condition.

Verifying whether the user satisfies the first dynamic condition may include obtaining one or more session variables associated with the user when the user is in the first user group and comparing the one or more session variable associated with the user to the first dynamic condition to determine whether the user satisfies the first dynamic condition. In an implementation, allowing the user to access the first element set in the database object comprises generating a dynamic pseudo-view of the database object comprising only the first element set in the database object when the user satisfies the first dynamic condition and responding to the request from the user using the dynamic pseudo-view of the database object.

In some embodiments, the database object is a table or a view, at least one element in the first element set is a column, the first dynamic condition is a session context or a session purpose associated with a user in the first user group, and the access restriction is stored in a database. Additionally, the access restriction can further define an additional dynamic condition the first user group must satisfy in order to access the first element set.

In other implementations, the access restriction further defines a second dynamic condition the first user group must alternatively satisfy in order to access the database object and further identifies a second element set in the database object accessible to the first user group when the second dynamic condition is satisfied. At least one element in the first element set may also be an element in the second element set.

Further aspects may include determining whether another access restriction is imposed on the database object, the other access restriction specifying a second user group to which the other access restriction is applicable. The other access restriction can also define another dynamic condition the second user group must satisfy in order to access the database object and identify another element set in the database object accessible to the second user group when the other dynamic condition is satisfied. In one embodiment, at least one user in the first user group is also a user in the second user group.

Another implementation also includes deciding whether an exception to the access restriction is applicable to the user requesting access to the database object and permitting the user to access the elements in the database object when the exception to the access restriction is applicable to the user.

BRIEF DESCRIPTION OF THE DRAWINGS

FIG. 6 shows a sample database object and exemplary dynamic pseudo-views generated based on the sample database object according to one aspect of the invention.

DETAILED DESCRIPTION

The present invention relates generally to database systems and more particularly to controlling access to elements in a database object. The following description is presented to enable one of ordinary skill in the art to make and use the invention. Various modifications to the preferred implementations and the generic principles and features described herein will be readily apparent to those skilled in the art. Thus, the present invention is not intended to be limited to the implementations shown, but is to be accorded the widest scope consistent with the principles and features described herein.

Figure 1:
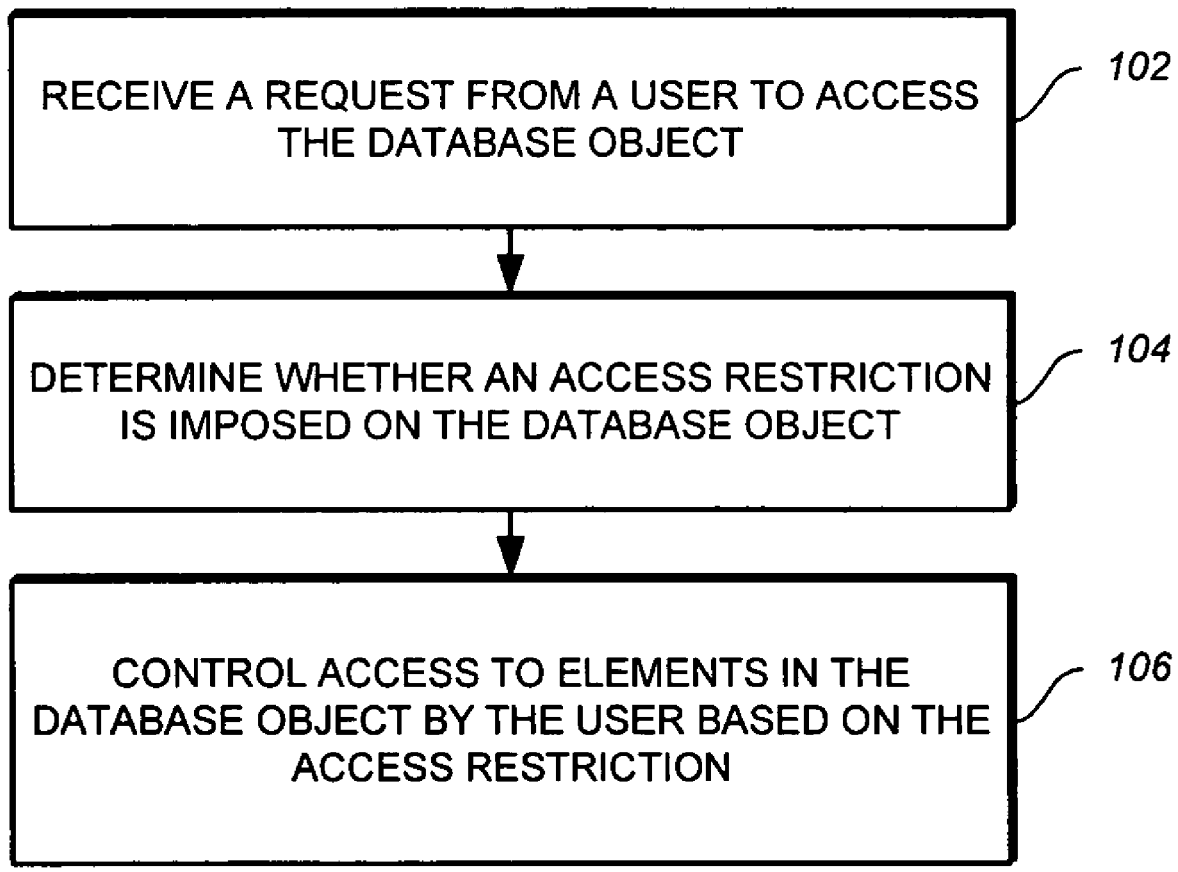
FIG. 1 is a process flow of a method for controlling access to elements in a database object according to an aspect of the invention.

FIG. 1 depicts a process 100 for controlling access to elements in a database object. At 102, a request to access the database object is received from a user. A determination is then made at 104 as to whether an access restriction is imposed on the database object. In an embodiment, the access restriction specifies a first user group comprising one or more users to which the access restriction is applicable, defines a first dynamic condition the first user group must satisfy in order to access the database object, and identifies a first element set comprising one or more of the elements in the database object accessible to the first user group when the first dynamic condition is satisfied. In this document, a group of one or more users is denoted as a user group and a set of one or more of the elements in a database object is denoted as an element set in the database object.

Access to the elements in the database object by the user is controlled based on the access restriction when the access restriction is imposed on the database object and the user is in the first user group (106). In some implementations, the database object is a table or a view, at least one element in the first element set is a column, and the first dynamic condition is a session context or a session purpose associated with a user in the first user group.

A session purpose could be determined based on the type of application the user is employing when requesting access to the database object, for example, a purchasing application or a marketing application. A session context could be the location from which the user is requesting access to the database object, for instance, from the office or at home. The location may be determined based on the IP address of the computer from which the user is requesting access.

Session context and session purpose are just two examples of dynamic conditions. A dynamic condition can also be a function. For example, the condition can be "F(current time) is TRUE" where "F" is a function that compares the current time to the time of the day when access can be granted.

Figure 2:
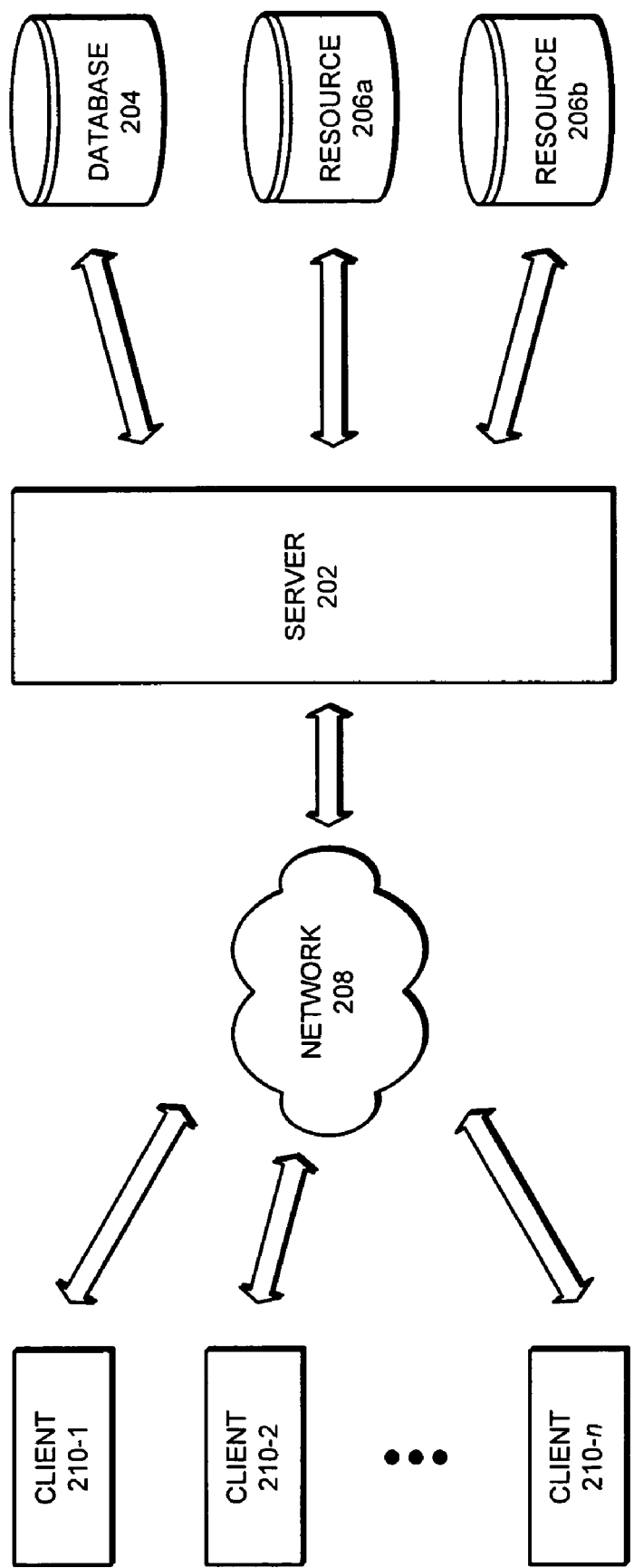
FIG. 2 illustrates a system according to one embodiment of the invention.

Illustrated in FIG. 2 is a system 200 including a server 202 interconnected to clients 210-1 to 210-n via a network 208. Server 202 and clients 210-1 to 210-n may be any data processing system, such as computers, workstations, and handheld portable devices. In addition, system 200 may include more or less clients in other embodiments. Network 208 may be the Internet or World Wide Web (WWW) in some implementations.

System 200 also includes a database 204 and resources 206a-206b. Each resource may be a storage media, a database, a set of XML (eXtensible Markup Language) documents, a directory service, such as LDAP (Lightweight Directory Access Protocol) server, or a backend system. Other embodiments of system 200 may include more or less databases and/or resources.

Database 204 and resources 206a-206b are coupled to server 202. The interface between server 202 and database 204 and resources 206a-206b may be a local area network, Internet, a proprietary interface, or any combination of the foregoing. Clients 210-1 to 210-n can access database 204 and resources 206a-206b through server 202. Any of server 202, database 204, resources 206a-206b, and clients 210-1 to 210-n may be located remotely from one another or may share a location.

The configuration of system 200 is not intended as a limitation of the present invention, as will be understood by those of ordinary skill in the art from a review of the following detailed description. For example, network 208 may comprise a wireless link, a telephone communication, a radio communication, or a computer network (e.g., a Local Area Network (LAN) or a Wide Area Network (WAN)).

In one implementation, database 204 is operable to store a database object comprising a plurality of elements and server 202 is operable to receive a request from a user to access the database object. The request may be submitted by the user through one of clients 210-1 to 210-n. Server 202 is also operable to determine whether an access restriction is imposed on the database object. The access restriction specifies a first user group to which the access restriction is applicable, defines a first dynamic condition the first user group must satisfy in order to access the database object, and identifies a first element set in the database object accessible to the first user group when the first dynamic condition is satisfied.

Server 202 is then operable to control access to the elements in the database object by the user based on the access restriction when the access restriction is imposed on the database object and the user is in the first user group. In some embodiments, database 204 is further operable to store the access restriction. The access restriction may be stored in a catalog of database 204 (not shown).

Figure 3:
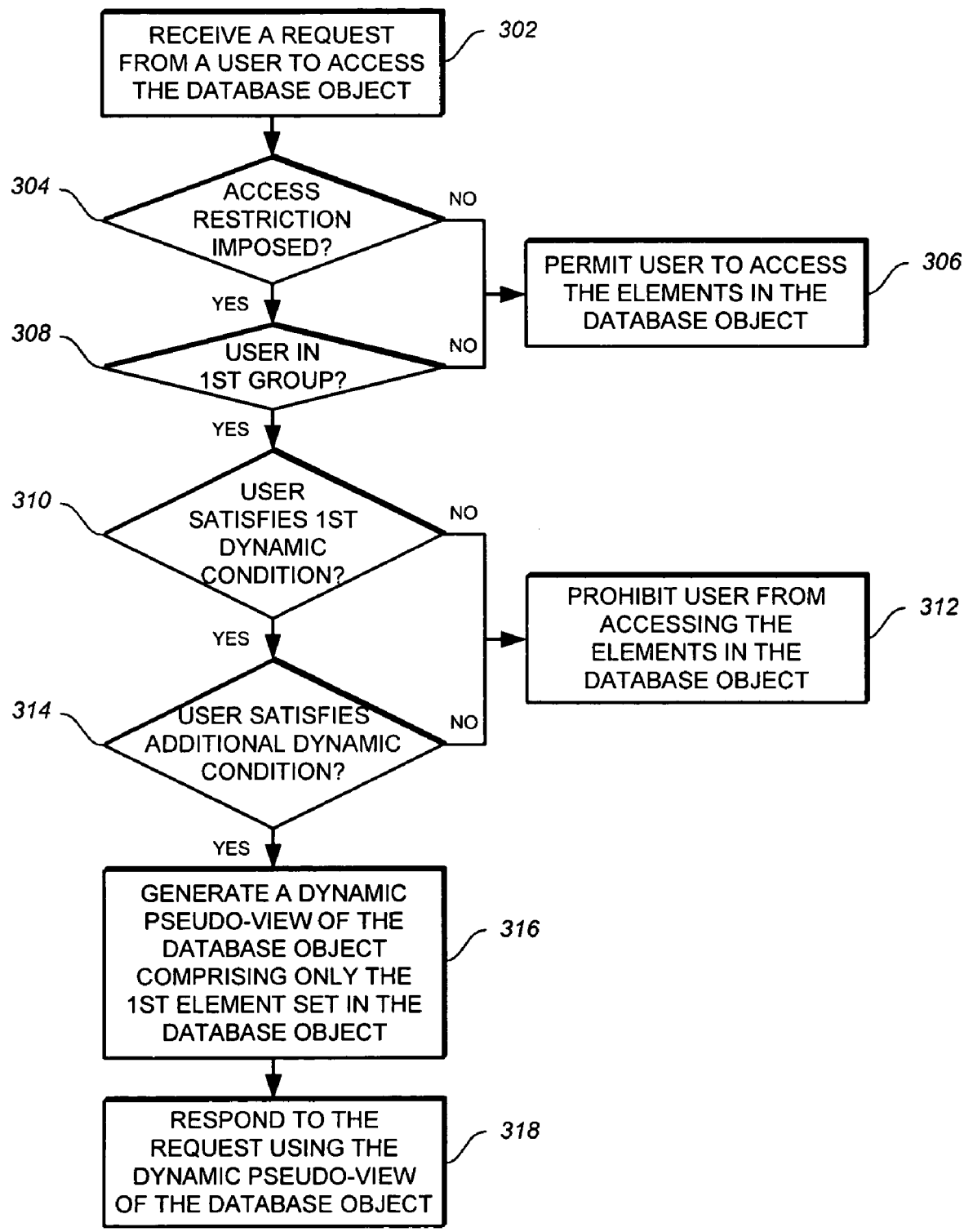
FIGS. 3-5 depict flowcharts of methods for controlling access to elements in a database object according to various implementations of the invention.

FIG. 3 shows a process 300 for controlling access to elements in the database object according to an aspect of the invention. A request to access the database object is received from a user at 302. At 304, a determination is made as to whether an access restriction is imposed on the database object. The access restriction specifies a first user group to which the access restriction is applicable, defines a first dynamic condition and an additional dynamic condition the first user group must satisfy in order to access the database object, and identifies a first element set in the database object accessible to the first user group when the first dynamic condition and the additional dynamic condition are satisfied.

If no access restriction is imposed on the database object, the user is permitted to access the elements in the database object (306). However, if the access restriction is imposed on the database object, process 300 confirms whether the user is in the first user group to which the access restriction is applicable (308). When the user is not in the first user group, process 300 proceeds to 306 and the user is permitted to access the elements in the database object.

When the user is in the first user group, process 300 verifies whether the user satisfies the first dynamic condition (310). If the user does not satisfy the first dynamic condition, the user is prohibited from accessing the elements in the database object (312). If the user does satisfy the first dynamic condition, process 300 verifies whether the user satisfies the additional dynamic condition (314). When the user fails to satisfy the additional dynamic condition, process 300 proceeds to 312 and prohibits the user from accessing the elements in the database object.

A dynamic pseudo-view of the database object comprising only the first element set is generated when the user satisfies the first dynamic condition and the additional dynamic condition (316). The request from the user is then responded to using the dynamic pseudo-view of the database object (318). A dynamic pseudo-view is a view-like entity with attributes similar to a predefined regular view. However, because it is dynamically created, it does not exist in a database, such as database 204 in FIG. 2, and has no dependencies.

Figure 4:
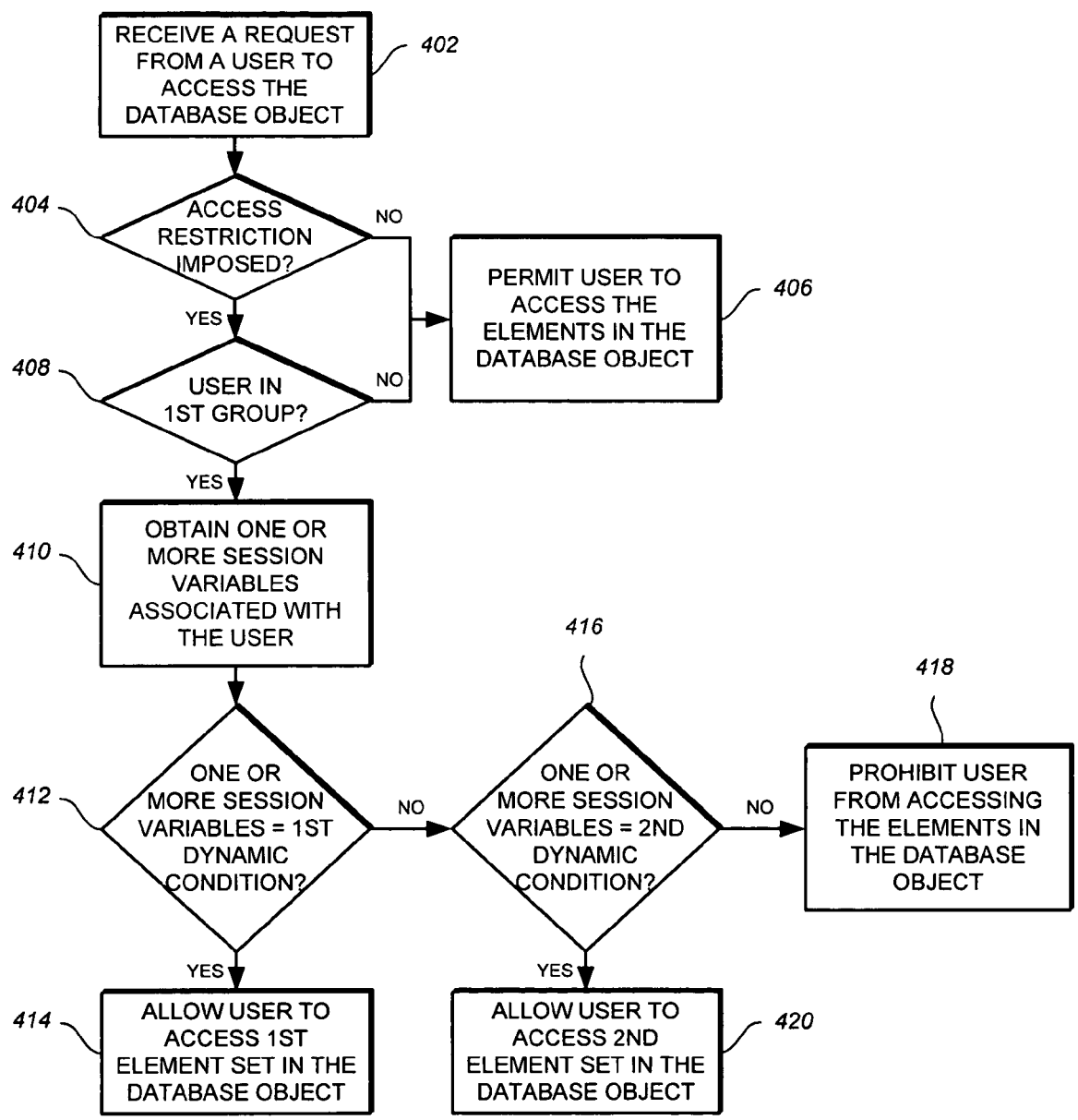

Depicted in FIG. 4 is another process 400 for controlling access to elements in a database object. At 402, a request is received from a user to access the database object. A determination is then made at 404 as to whether an access restriction is imposed on the database object. The access restriction specifies a first user group to which the access restriction is applicable, defines a first dynamic condition the first user group must satisfy in order to access the database object, and identifies a first element set in the database object accessible to the first user group when the first dynamic condition is satisfied.

In the embodiment, the access restriction also defines a second dynamic condition the first user group must alternatively satisfy in order to access the database object and identifies a second element set in the database object accessible to the first user group when the second dynamic condition is satisfied. In some implementations, at least one element in the first element set is also an element in the second element set.

When no access restrictions are imposed on the database object, the user is permitted to access the elements in the database object (406). When the access restriction is imposed on the database object, process 400 confirms whether the user is in the first user group (408). If the user is not in the first user group, process 400 proceeds to 406 and permits the user to access the elements in the database object.

If the user is in the first user group, one or more session variables associated with the user is obtained (410). In one embodiment, when the user establishes a session through some application, a session start trigger will populate one or more session variables associated with the user with the appropriate values based on information from the user and the application. The session start trigger is a program that is automatically executed when a session is established. Process 400 then compares the one or more session variables associated with the user to the first dynamic condition to determine whether the user satisfies the first dynamic condition (412).

The user is allowed to access the first element set in the database object when the user satisfies the first dynamic condition, i.e., the one or more session variables match or correspond to the first dynamic condition (414). When the one or more session variables do not match the first dynamic condition, process 400 compares them to the second dynamic condition (416). If they also fail to match the second dynamic condition, the user is prohibited from accessing the elements in the database object (418). However, if the one or more session variables associated with the user match the second dynamic condition, the user is allowed to access the second element set in the database object (420).

Figure 5:
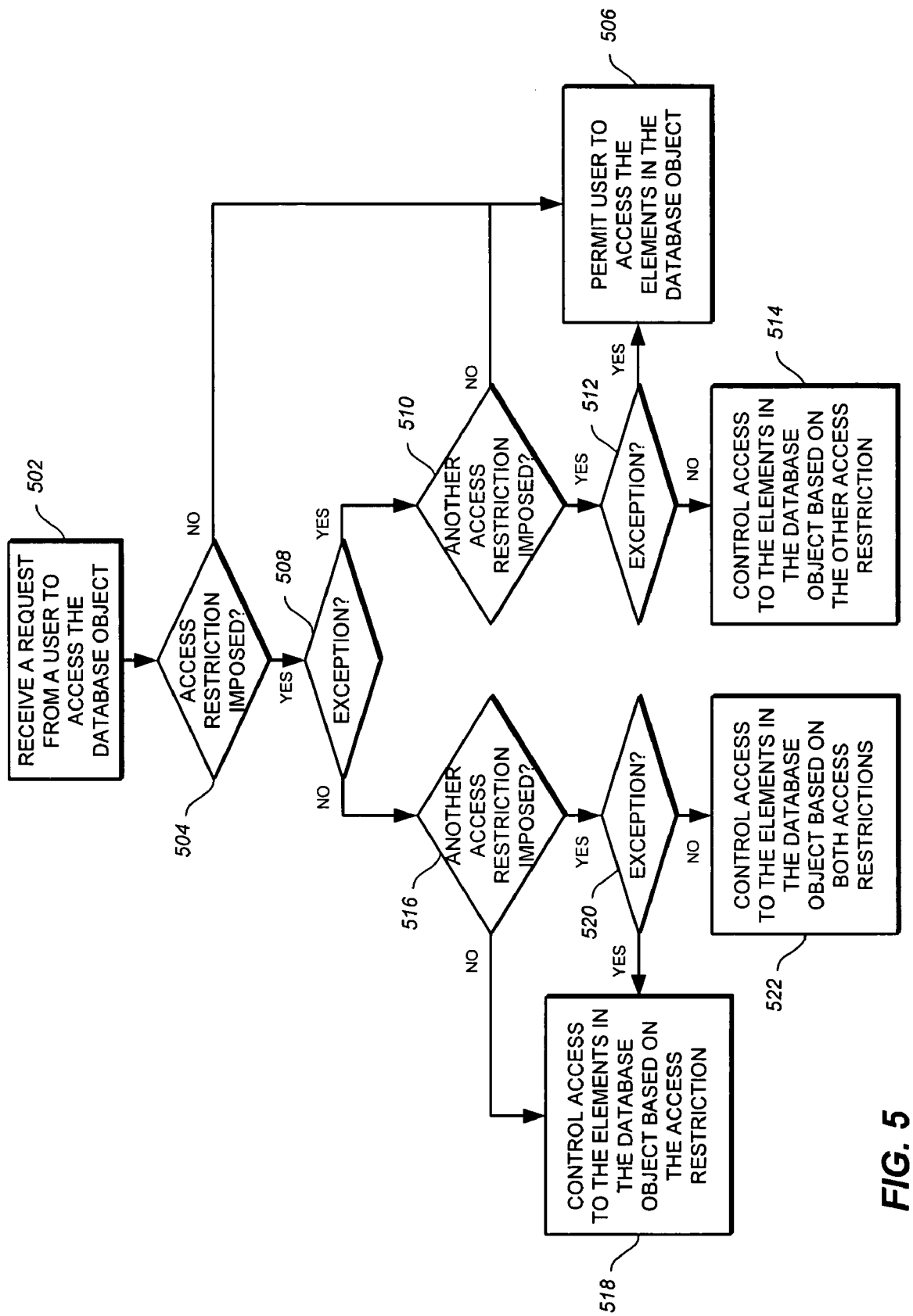

FIG. 5 illustrates a process 500 for controlling access to elements in a database object according to a further embodiment of the invention. A request to access the database object is received from a user at 502. A determination is then made at 504 as to whether an access restriction has been imposed on the database object. The access restriction specifies a first user group to which the access restriction is applicable, defines a first dynamic condition the first user group must satisfy in order to access the database object, and identifies a first element set in the database object accessible to the first user group when the first dynamic condition is satisfied.

If no access restrictions are imposed on the database object, the user is permitted to access the elements in the database object (506). If, however, the access restriction has been imposed on the database object, process 500 decides whether an exception to the access restriction is applicable to the user requesting access to the database object (508). When the exception to the access restriction is applicable to the user at block 508, a determination is made as to whether another access restriction is imposed on the database object, the other access restriction specifies a second user group to which the other access restriction is applicable (510). In an implementation, at least one user in the first user group is also a user in the second user group.

The other access restriction may further define another dynamic condition the second user group must satisfy in order to access the database object and identify another element set in the database object accessible to the second user group when the other dynamic condition is satisfied. Additionally, the other element set in the database object may be a subset of the first element set.

Process 500 will proceed to 506 to permit the user to access the elements in the database object when no other access restrictions are imposed on the database object. However, it will decide whether an exception to the other access restriction is applicable to the user requesting access to the database object when the other access restriction is also imposed on the database object (512). The user is permitted to access the elements in the database object if the exception to the other access restriction is applicable to the user (506). In contrast, access to the elements in the database object by the user is controlled based on the other access restriction if the exception to the other access restriction is inapplicable to the user (514).

When the exception to the access restriction is not applicable to the user at block 508, a determination is made as to whether another access restriction is imposed on the database object (516). If no other access restrictions are imposed on the database object, access to the elements in the database object by the user is controlled based on the access restriction (518). However, if another access restriction is imposed on the database object, process 500 will decide whether an exception to the other access restriction is applicable to the user requesting access to the database object (520).

Access to the elements in the database object by the user will be controlled based on the access restriction when the exception to the other access restriction is applicable to the user (518). Conversely, access to the elements in the database object by the user will be controlled based on both access restrictions when the exception to the other access restriction is not applicable to the user (522).

Shown in FIG. 6 is a sample database object 600 with elements 602-610. Database object 600 is a table called "customer data" with a column 602 for names, a column 604 for addresses, a column 606 for phone numbers, and a column 608 for credit card numbers. Table 600 has n number of rows 610-1 to 610-n. Embodiments of the present invention enables access restrictions to be created such that it becomes possible to express which elements 602-610 in database object 600 are accessible by a user and under what condition.

For example, suppose a user named "Bob" is allowed to access columns 602, 604, and 608 in table 600 for the purpose of "Billing" and only columns 602 and 604 for the purpose of "Marketing." The following Structured Query Language (SQL) statement illustrates how an access restriction can be created to limit user Bob's access to columns 602-610 in table 600 based on the purpose of access.

CREATE RESTRICTION r1
ON TABLE customer data
FOR Bob
TO COLUMNS
   (name, address, credit card) WHEN (SessionVariablePurpose ='Billing')
   (name, address) WHEN (SessionVariablePurpose ='Marketing')

Thus, when table 600 is queried by user Bob, server 202 in FIG. 2 for example, can determine that an access restriction applies for user Bob. Server 202 may then look up a session variable "SessionVariablePurpose" associated with user Bob and read its value. If it is set to "Billing," server 202 will implement access restriction "r1" in the query plan as if that restriction was statically defined as follows:

CREATE RESTRICTION r1
ON TABLE customer data
FOR Bob
TO COLUMNS (name, address, credit card)

A dynamic pseudo-view 612a of table 600 that is depicted in FIG. 6 can be generated to respond to user Bob's queries to table 600.

However, if the value of the session variable "SessionVariablePurpose" was "Marketing," then server 202 will implement restriction "r1" in the query plan as if that restriction was statically defined as follows:

CREATE RESTRICTION r1
ON TABLE customer data
FOR Bob
TO COLUMNS (name, address)

A dynamic pseudo-view 612b of table 600, which is illustrated in FIG. 6, will be generated to respond to user Bob's queries on table 600. For more information regarding the creation and use of access restrictions, see "A Method for Implementing Fine-Grained Access Control Using Access Restrictions," U.S. patent application Ser. No. 10/837,387, filed on Apr. 30, 2004, which is hereby incorporated by reference in its entirety for all purposes.

The invention can take the form of an entirely hardware embodiment, an entirely software embodiment, or an embodiment containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Figure 7:
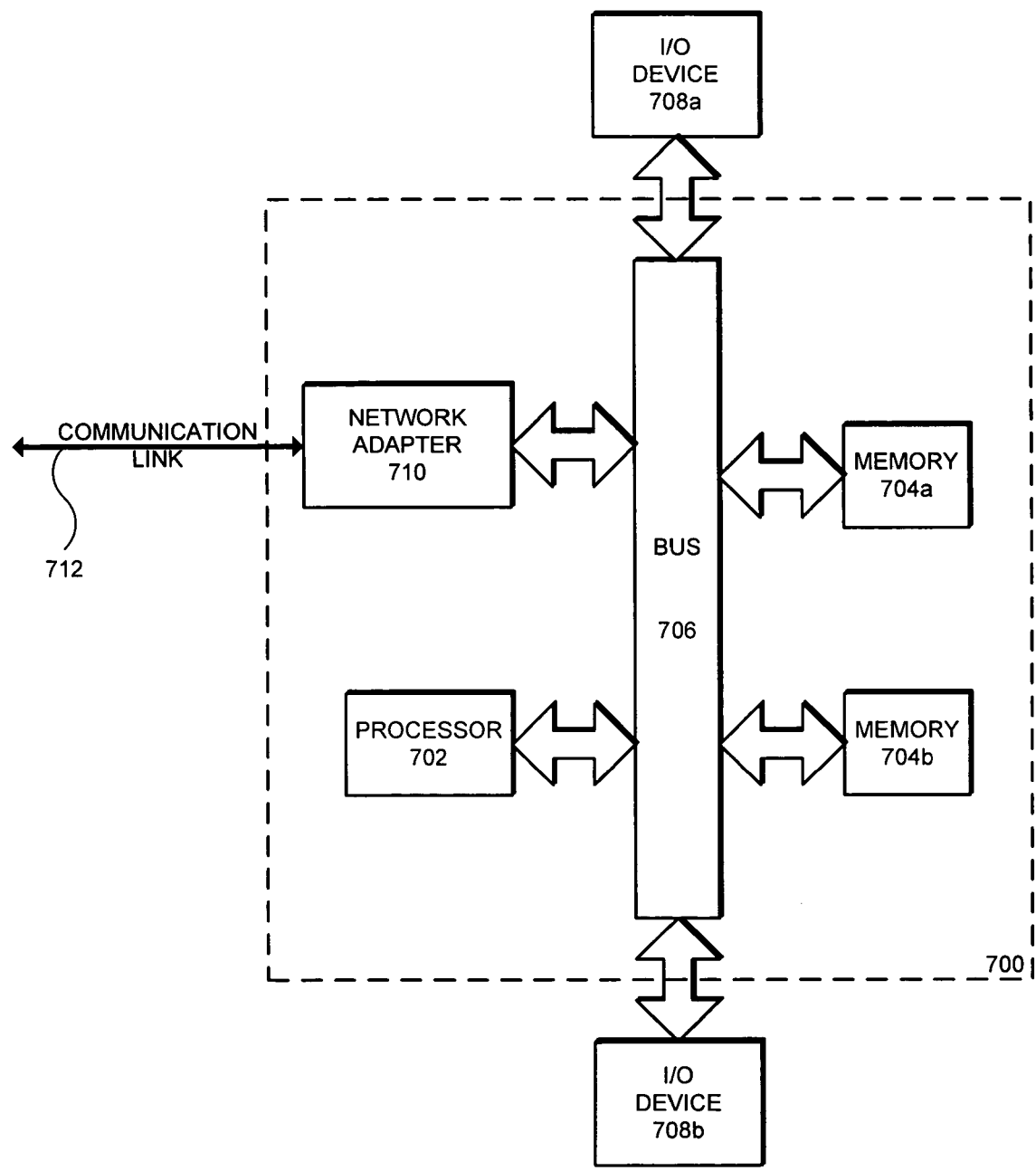
FIG. 7 is a block diagram of a data processing system with which embodiments of the present invention can be implemented.

FIG. 7 depicts a data processing system 700 suitable for storing and/or executing program code. Data processing system 700 includes a processor 702 coupled to memory elements 704a-b through a system bus 706. In other embodiments, data processing system 700 may include more than one processor and each processor may be coupled directly or indirectly to one or more memory elements through a system bus.

Memory elements 704a-b can include local memory employed during actual execution of the program code, bulk storage, and cache memories that provide temporary storage of at least some program code in order to reduce the number of times the code must be retrieved from bulk storage during execution. As shown, input/output or I/O devices 708a-b (including, but not limited to, keyboards, displays, pointing devices, etc.) are coupled to data processing system 700. I/O devices 708a-b may be coupled to data processing system 700 directly or indirectly through intervening I/O controllers (not shown).

In the embodiment, a network adapter 710 is coupled to data processing system 700 to enable data processing system 700 to become coupled to other data processing systems or remote printers or storage devices through communication link 712. Communication link 712 can be a private or public network. Modems, cable modems, and Ethernet cards are just a few of the currently available types of network adapters.

Various implementations for controlling access to elements in a database object have been described. Nevertheless, one of ordinary skill in the art will readily recognize that various modifications may be made to the implementations, and any variations would be within the spirit and scope of the present invention. For example, the above-described process flows are described with reference to a particular ordering of process actions. However, the ordering of many of the described process actions may be changed without affecting the scope or operation of the invention. Accordingly, many modifications may be made by one of ordinary skill in the art without departing from the spirit and scope of the following claims.

What is claimed is:

1. A method of controlling access to elements in a database object, the method comprising:
    receiving a request from a user to access the database object, wherein the request includes a query to retrieve information from the database object;
    determining whether an access restriction is imposed on the database object, the access restriction specifying a first user group to which the access restriction is applicable, defining a first dynamic condition the first user group must satisfy in order to access the database object, and identifying a first element set in the database object accessible to the first user group when the first dynamic condition is satisfied, wherein the first element set includes at least one, and less than all, table columns of the database object to restrict access to one or more table columns, wherein the first dynamic condition indicates access information including one or more of a session context and session purpose for the user to access the database object, and wherein two or more of said session contexts and purposes for the user to access the database object enable access to be restricted to at least one different table column of said database object; and
    controlling access to the elements in the database object by the user based on the access restriction, wherein controlling access to the elements in the database objects comprises:
        confirming whether the user is in the first user group when the access restriction is imposed on the database object;
        verifying whether the user satisfies the first dynamic condition when the user is in the first user group by ascertaining session information for the user from one or more session variables associated with the user, wherein the session information includes one or more of the session context and session purpose for access of the database object, and comparing the session information for the user against the access information indicated by the first dynamic condition to determine satisfaction of that condition; and
        allowing the user to access the first element set when the user satisfies the first dynamic condition, wherein allowing the user to access the first element set comprises:
            dynamically generating a dynamic pseudo-view of the database object comprising only the first element set in response to said verification of the user satisfying the first dynamic condition; and
            responding to the request from the user by applying the received query to the dynamic pseudo-view of the database object to retrieve the information.

2. The method of claim 1, wherein the database object is a table or a view.

3. The method of claim 1, wherein the access restriction further defines a second dynamic condition the first user group must alternatively satisfy in order to access the database object and further identifies a second element set in the database object accessible to the first user group when the second dynamic condition is satisfied.

4. The method of claim 3, wherein at least one element in the first element set is also an element in the second element set.

5. The method of claim 1, wherein the access restriction further defines an additional dynamic condition the first user group must satisfy in order to access the first element set.

6. The method of claim 1, further comprising:
    determining whether another access restriction is imposed on the database object, the other access restriction specifying a second user group to which the other access restriction is applicable.

7. The method of claim 6, wherein the other access restriction further defines another dynamic condition the second user group must satisfy in order to access the database object and identifies another element set in the database object accessible to the second user group when the other dynamic condition is satisfied.

8. The method of claim 7, wherein the other element set is a subset of the first element set.

9. The method of claim 6, wherein at least one user in the first user group is also a user in the second user group.

10. The method of claim 1, further comprising:
    deciding whether an exception to the access restriction is applicable to the user requesting access to the database object; and
    permitting the user to access the elements in the database object when the exception to the access restriction is applicable to the user.

11. A system comprising:
    a database operable to store a database object, the database object comprising elements; and a server coupled to the database, the server comprising a processor and a memory, the server being operable to:
receive a request from a user to access the database object, wherein the request includes a query to retrieve information from the database object;
determine whether an access restriction is imposed on the database object, the access restriction specifying a first user group to which the access restriction is applicable, defining a first dynamic condition the first user group must satisfy in order to access the database object, and identifying a first element set in the database object accessible to the first user group when the first dynamic condition is satisfied, wherein the first element set includes at least one, and less than all, table columns of the database object to restrict access to one or more table columns, wherein the first dynamic condition indicates access information including one or more of a session context and session purpose for the user to access the database object, and wherein two or more of said session contexts and purposes for the user to access the database object enable access to be restricted to at least one different table column of said database object; and
control access to the elements in the database object by the user based on the access restriction, wherein controlling access to the elements in the database object comprises:
confirming whether the user is in the first user group when the access restriction is imposed on the database object;
verifying whether the user satisfies the first dynamic condition when the user is in the first user group by ascertaining session information for the user from one or more session variables associated with the user, wherein the session information includes one or more of the session context and session purpose for access of the database object, and comparing the session information for the user against the access information indicated by the first dynamic condition to determine satisfaction of that condition; and
allowing the user to access the first element set when the user satisfies the first dynamic condition, wherein allowing the user to access the first element set comprises:
dynamically generating a dynamic pseudo-view of the database object comprising only the first element set in response to said verification of the user satisfying the first dynamic condition; and
responding to the request from the user by applying the received query to the dynamic pseudo-view of the database object to retrieve the information.

12. The system of claim 11, wherein the database object is a table or a view.

13. The system of claim 11, wherein the access restriction further defines a second dynamic condition the first user group must alternatively satisfy in order to access the database object and further identifies a second element set in the database object accessible to the first user group when the second dynamic condition is satisfied.

14. The system of claim 13, wherein at least one element in the first element set is also an element in the second element set.

15. The system of claim 11, wherein the access restriction further defines an additional dynamic condition the first user group must satisfy in order to access the first element set.

16. The system of claim 11, wherein the server is further operable to:
determine whether another access restriction is imposed on the database object, the other access restriction specifying a second user group to which the other access restriction is applicable.

17. The system of claim 16, wherein the other access restriction further defines another dynamic condition the second user group must satisfy in order to access the database object and identifies another element set in the database object accessible to the second user group when the other dynamic condition is satisfied.

18. The system of claim 17, wherein the other element set is a subset of the first element set.

19. The system of claim 16, wherein at least one user in the first user group is also a user in the second user group.

20. The system of claim 11, wherein the server is further operable to:
decide whether an exception to the access restriction is applicable to the user requesting access to the database object; and
permit the user to access the elements in the database object when the exception to the access restriction is applicable to the user.

21. A computer program product comprising a computer-readable storage medium, the computer-readable storage medium including a computer-readable program for controlling access to elements in a database object, wherein the computer-readable program when executed on a computer causes the computer to:
receive a request from a user to access the database object, wherein the request includes a query to retrieve information from the database object;
determine whether an access restriction is imposed on the database object, the access restriction specifying a first user group to which the access restriction is applicable, defining a first dynamic condition the first user group must satisfy in order to access the database object, and identifying a first element set in the database object accessible to the first user group when the first dynamic condition is satisfied, wherein the first element set includes at least one, and less than all, table columns of the database object to restrict access to one or more table columns, wherein the first dynamic condition indicates access information including one or more of a session context and session purpose for the user to access the database object, and wherein two or more of said session contexts and purposes for the user to access the database object enable access to be restricted to at least one different table column of said database object; and
control access to the elements in the database object by the user based on the access restriction, wherein controlling access to the elements in the database object comprises:
confirming whether the user is in the first user group when the access restriction is imposed on the database object;
verifying whether the user satisfies the first dynamic condition when the user is in the first user group by ascertaining session information for the user from one or more session variables associated with the user, wherein the session information includes one or more of the session context and session purpose for access of the database object, and comparing the session information for the user against the access information indicated by the first dynamic condition to determine satisfaction of that condition; and allowing the user to access the first element set when the user satisfies the first dynamic condition, wherein allowing the user to access the first element set comprises:

dynamically generating a dynamic pseudo-view of the database object comprising only the first element set in response to said verification of the user satisfying the first dynamic condition; and responding to the request from the user by applying the received query to the dynamic pseudo-view of the database object to retrieve the information.

22. The computer program product of claim 21, wherein the database object is a table or a view.

23. The computer program product of claim 21, wherein the access restriction further defines a second dynamic condition the first user group must alternatively satisfy in order to access the database object and further identifies a second element set in the database object accessible to the first user group when the second dynamic condition is satisfied.

24. The computer program product of claim 23, wherein at least one element in the first element set is also an element in the second element set.

25. The computer program product of claim 21, wherein the access restriction further defines an additional dynamic condition the first user group must satisfy in order to access the first element set.

26. The computer program product of claim 21, wherein the computer-readable program when executed on the computer further causes the computer to:

determine whether another access restriction is imposed on the database object, the other access restriction specifying a second user group to which the other access restriction is applicable.

27. The computer program product of claim 26, wherein the other access restriction further defines another dynamic condition the second user group must satisfy in order to access the database object and identifies another element set in the database object accessible to the second user group when the other dynamic condition is satisfied.

28. The computer program product of claim 27, wherein the other element set is a subset of the first element set.

29. The computer program product of claim 26, wherein at least one user in the first user group is also a user in the second user group.

30. The computer program product of claim 21, wherein the computer-readable program when executed on the computer further causes the computer to:

decide whether an exception to the access restriction is applicable to the user requesting access to the database object; and permit the user to access the elements in the database object when the exception to the access restriction is applicable to the user.

* * * * *